United States Patent
Andersson et al.

(10) Patent No.: US 12,139,673 B2
(45) Date of Patent: Nov. 12, 2024

(54) METHOD FOR CO-PRODUCTION OF AVIATION FUEL AND DIESEL

(71) Applicant: HALDOR TOPSØE A/S, Kgs. Lyngby (DK)

(72) Inventors: Asbjørn Sune Andersson, Bagsværd (DK); Ole Frej Alkilde, Valby (DK); Thi Hong Diep Duong, Skovlunde (DK)

(73) Assignee: HALDOR TOPSØE A/S, Kgs. Lyngby (DK)

( * ) Notice: Subject to any disclaimer, the term of this patent is extended or adjusted under 35 U.S.C. 154(b) by 0 days.

(21) Appl. No.: 17/287,729

(22) PCT Filed: Oct. 23, 2019

(86) PCT No.: PCT/EP2019/078904
§ 371 (c)(1),
(2) Date: Apr. 22, 2021

(87) PCT Pub. No.: WO2020/083998
PCT Pub. Date: Apr. 30, 2020

(65) Prior Publication Data
US 2021/0395615 A1  Dec. 23, 2021

(30) Foreign Application Priority Data

Oct. 24, 2018 (DK) .......................... PA 2018 00767
Jul. 9, 2019 (DK) .......................... PA 2019 00851
Jul. 9, 2019 (DK) .......................... PA 2019 00852

(51) Int. Cl.
*C10G 65/12* (2006.01)
*C10G 3/00* (2006.01)
(Continued)

(52) U.S. Cl.
CPC ............. *C10G 65/12* (2013.01); *C10G 3/45* (2013.01); *C10G 3/46* (2013.01); *C10G 3/50* (2013.01);
(Continued)

(58) Field of Classification Search
None
See application file for complete search history.

(56) References Cited

U.S. PATENT DOCUMENTS 7,846,323 B2   12/2010   Abhari et al.
8,193,399 B2   6/2012    Gosling
(Continued)

FOREIGN PATENT DOCUMENTS

CN   103328613 A   9/2013
JP   2015007238 A  1/2015
(Continued)

OTHER PUBLICATIONS

Office Action received for Chinese Patent Application No. 201980067845.3, mailed on Apr. 8, 2022, 18 pages (10 pages of English Translation and 8 pages of Original Document).
(Continued)

*Primary Examiner* — Tam M Nguyen
(74) *Attorney, Agent, or Firm* — Boone IP Law (57) ABSTRACT

A process plant and a process for production of a hydrocarbon fraction suitable for use as jet fuel from a feedstock being a renewable feedstock or an oxygenate feedstock, including combining the feedstock with an amount of a hydrocracked intermediate product and optionally an additional liquid diluent, to form a combined feedstock, directing the combined feedstock to contact a material catalytically active in hydrodeoxygenation under hydrotreating conditions to provide a hydrodeoxygenated intermediate product, separating the hydrodeoxygenated intermediate product in at
(Continued)

least two fractions; a vapor fraction and a liquid fraction, directing at least an amount of the liquid fraction to contact a material catalytically active in isomerization under isomerization conditions to provide an isomerized intermediate product, fractionating said isomerized intermediate product to provide at least a hydrocarbon suitable for use as jet fuel and a bottom fraction, hydrocracking the bottom fraction to provide the hydrocracked intermediate product.

13 Claims, 3 Drawing Sheets

(51) Int. Cl.
| | |
|---|---|
| C10G 45/48 | (2006.01) |
| C10G 45/52 | (2006.01) |
| C10G 45/62 | (2006.01) |
| C10G 47/14 | (2006.01) |
| C10G 47/18 | (2006.01) |
| C10G 47/20 | (2006.01) |
| C10G 67/02 | (2006.01) |
| C10G 69/04 | (2006.01) |
| C10L 1/08 | (2006.01) |

(52) U.S. Cl.
CPC ............ *C10G 45/48* (2013.01); *C10G 45/52* (2013.01); *C10G 45/62* (2013.01); *C10G 47/14* (2013.01); *C10G 47/18* (2013.01); *C10G 47/20* (2013.01); *C10G 67/02* (2013.01); *C10G 69/04* (2013.01); *C10L 1/08* (2013.01); *C10G 2300/1011* (2013.01); *C10G 2300/1014* (2013.01); *C10G 2300/1018* (2013.01); *C10G 2300/301* (2013.01); *C10G 2300/304* (2013.01); *C10G 2300/4006* (2013.01); *C10G 2300/4012* (2013.01); *C10G 2300/4018* (2013.01); *C10G 2300/4081* (2013.01); *C10G 2300/802* (2013.01); *C10G 2400/04* (2013.01); *C10G 2400/08* (2013.01); *C10L 2200/043* (2013.01); *C10L 2200/0484* (2013.01); *C10L 2270/04* (2013.01)

(56) References Cited

U.S. PATENT DOCUMENTS

| | | | |
|---|---|---|---|
| 9,039,790 B2* | 5/2015 | Kalnes | C10L 1/00 44/403 |
| 2009/0158637 A1* | 6/2009 | McCall | C10G 45/02 44/308 |
| 2009/0229173 A1 | 9/2009 | Gosling | |
| 2009/0250376 A1 | 10/2009 | Brandvold et al. | |
| 2009/0283442 A1 | 11/2009 | Mccall et al. | |
| 2010/0000908 A1 | 1/2010 | Markkanen et al. | |
| 2010/0133144 A1 | 6/2010 | Kokayeff et al. | |
| 2010/0242349 A1 | 9/2010 | Abe et al. | |
| 2011/0166396 A1 | 7/2011 | Egeberg et al. | |
| 2011/0219677 A1 | 9/2011 | Koyama et al. | |
| 2011/0319683 A1 | 12/2011 | Abhari et al. | |
| 2012/0216449 A1 | 8/2012 | Hayasaka et al. | |
| 2014/0148626 A1* | 5/2014 | Parimi | B01J 35/0013 585/251 |
| 2014/0187827 A1 | 7/2014 | Abdallah et al. | |
| 2015/0057474 A1 | 2/2015 | Nousiainen et al. | |
| 2016/0130509 A1 | 5/2016 | Nousiainen et al. | |
| 2016/0177188 A1 | 6/2016 | Vilonen et al. | |
| 2016/0243537 A1 | 8/2016 | Robinson et al. | |
| 2016/0289135 A1 | 10/2016 | Fichtl | |
| 2016/0289576 A1 | 10/2016 | Eilos | |
| 2017/0218288 A1 | 8/2017 | Vauhkonen et al. | |
| 2017/0327757 A1 | 11/2017 | Abhari et al. | |
| 2019/0185758 A1 | 6/2019 | Tsuto et al. | |
| 2020/0017775 A1 | 1/2020 | Lindberg et al. | |
| 2021/0371761 A1* | 12/2021 | Andersson | C10G 65/12 |
| 2022/0127537 A1* | 4/2022 | Bozzano | C10G 45/58 |

FOREIGN PATENT DOCUMENTS

| | | |
|---|---|---|
| WO | 2008124607 A1 | 10/2008 |
| WO | 2009120242 A1 | 10/2009 |
| WO | 2011148046 A1 | 12/2011 |
| WO | 2015002936 A1 | 1/2015 |
| WO | 2015004329 A1 | 1/2015 |
| WO | 2017197017 A1 | 11/2017 |
| WO | 2018058172 A1 | 4/2018 |

OTHER PUBLICATIONS

International Search Report (PCT/ISA/210) and Written Opinion (PCT/ISA/237) mailed on Nov. 29, 2019, by the European Patent Office as the International Searching Authority for International Application No. PCT/EP2019/078887.

International Search Report (PCT/ISA/210) and Written Opinion (PCT/ISA/237) mailed on Nov. 29, 2019, by the European Patent Office as the International Searching Authority for International Application No. PCT/EP2019/078896.

International Search Report (PCT/ISA/210) and Written Opinion (PCT/ISA/237) mailed on Nov. 29, 2019, by the European Patent Office as the International Searching Authority for International Application No. PCT/EP2019/078901.

International Search Report (PCT/ISA/210) and Written Opinion (PCT/ISA/237) mailed on Nov. 29, 2019, by the European Patent Office as the International Searching Authority for International Application No. PCT/EP2019/078904.

International Search Report (PCT/ISA/210) and Written Opinion (PCT/ISA/237) mailed on Nov. 29, 2019, by the European Patent Office as the International Searching Authority for International Application No. PCT/EP2019/078909.

Search Report mailed on Jan. 9, 2020 by the Danish Patent Office for Application No. PA 2019 00851.

Search Report mailed on Jan. 9, 2020 by the Danish Patent Office for Application No. PA 2019 00852.

Search Report mailed on May 22, 2019 by the Danish Patent Office for Application No. PA 2018 00767.

Office Action issued on Oct. 20, 2022, by the Intellectual Property India, Government of India in corresponding Indian Patent Application No. 202117018086, and an English Translation of the Office Action. (6 pages).

Office Action (Second Office Action) issued on Oct. 25, 2022 by the China National Intellectual Property Administration in corresponding Chinese Patent Application No. 201980070183.5, and an English Translation of the Office Action. (15 pages).

Zhu, Y. "Process of Petroleum Refining" (vol. II), China Petrochemical Press, pp. 152-154, May 1992 (with Concise Explanation of Relevance) (7 pages).

Office Action (Second Office Action) issued on Jul. 7, 2022 by the China National Intellectual Property Administration In corresponding Chinese Patent Application No. 201980067845.3, and an English Translation of the Office Action. (19 bages).

Common Knowledge Evidence 1: Zhang Shunyi, "Hydrogenation technology of sour crude oil", Sinopec Press, pp. 355-357, Jul. 2003.

\* cited by examiner

METHOD FOR CO-PRODUCTION OF AVIATION FUEL AND DIESEL

Conversion of oxygenates such as renewables in hydroprocessing has so far been focused on making diesel, since the paraffins corresponding to the typical fatty acids of biological materials such as vegetable oils and animal fats (C14, C16 and C18) typical boil from 250° C. to 320° C., corresponding well with typical diesel products boiling from 150° C. to 380° C. Jet fuel products require a boiling range of 120° C. to 300° C., which means that an amount of the heavy part of paraffins from renewable feedstocks needs to be converted into lighter materials to produce only jet fuel. The present disclosure relates to a process having a high yield of a mix of liquid transportation fuels, especially renewable diesel and renewable jet fuel meeting typical product requirements by selectively converting the heavy material to lighter material.

During hydrotreatment of renewable feedstocks in a unit designed for making diesel, an amount of jet fuel is often also produced. However, there is an interest in making a flexible and well controlled conversion from the intermediate products of renewable feedstocks boiling mainly in the diesel range to jet fuel products, which requires significant conversion.

The standard controlling the quality of jet fuel originating from hydroprocessed esters and fatty acids is ASTM D7566, A2.1, which inter alia specifies the boiling point curve and composition. Most of these properties can be easily met by hydrotreating and fractionation. However, special care need to be taken to meet the freezing point (FP) requirement of max −40° C. and the total aromatics content of max 0.5 wt/wt %. In addition, the standard requires an amount of low boiling product by requiring $T_{10}$, i.e. the temperatures below which 10% boils, to be below 205° C. The final boiling point (FBP) is specified as 300° C., according to ASTM D86, which means that all material boiling above 300° C. needs to be converted into lighter components to fall into the jet fuel range.

Now according to the present disclosure it is proposed to carry out combined production of diesel and jet fuel in a reverse stage two-stage configuration, where the feed is hydrodeoxygenated in the first stage, and after removal of sour gases the product is isomerized and possibly hydrodearomatized and finally fractionated. The heavy fraction of the product is recycled upstream the hydrodeoxygenation catalyst for conversion over a hydrocracking catalyst. By this process, hydrocracking may be carried out with either a less expensive base metal catalyst or a more specific and expensive noble metal catalyst in the first stage, whereas isomerization may be carried out on a selective noble metal catalyst, resulting in specific reduction of freezing point. If the amount of aromatics is too high, the conditions for isomerization may be optimized for simultaneous removal of aromatics, or a specific catalyst may be provided for this purpose.

In the following the term stage shall be used for a section of the process, in which no separation is performed.

In the following the abbreviation ppmw shall be used to signify parts per million weight, i.e. mg/kg.

In the following the abbreviation $ppm_{molar}$ shall be used to signify atomic parts per million.

In the following the abbreviation $ppm_v$ shall be used to signify volumetric parts per million, e.g. molar gas concentration.

In the following the abbreviation wt/wt % shall be used to signify weight percentage.

In the following the abbreviation vol/vol % shall be used to signify volume percentage for a gas.

In the following the term renewable feedstock or hydrocarbon shall be used to indicate a feedstock or hydrocarbon originating from biological sources or waste recycle. Recycled waste of fossil origin such as plastic shall also be construed as renewable.

In the following the term hydrodeoxygenation shall be used to signify removal of oxygen from oxygenates by formation of water in the presence of hydrogen, as well as removal of oxygen from oxygenates by formation of carbon oxides in the presence of hydrogen.

In the following, the term topology of a molecular sieve is used in the sense described in the "Atlas of Zeolite Framework Types," Sixth Revised Edition, Elsevier, 2007, and three letter framework type codes are used in accordance herewith.

A broad aspect of the present disclosure relates to a process for production of a hydrocarbon fraction suitable for use as jet fuel from an oxygenate feedstock, comprising the steps of combining the feedstock with an amount of a hydrocracked intermediate product and optionally an additional liquid diluent to form a combined feedstock, directing said combined feedstock to contact a material catalytically active in hydrodeoxygenation under hydrotreating conditions to provide a hydrodeoxygenated intermediate product, separating said hydrodeoxygenated intermediate product in at least two fractions; a vapor fraction and a liquid fraction, optionally providing an amount of said liquid fraction as said liquid diluent, directing at least an amount of said liquid fraction to contact a material catalytically active in isomerization under isomerization conditions to provide an isomerized intermediate product, fractionating said isomerized intermediate product to provide at least a hydrocarbon suitable for use as jet fuel and a bottom fraction, directing at least an amount of said bottom fraction to contact a material catalytically active in hydrocracking under hydrocracking conditions to provide the hydrocracked intermediate product, with the associated benefit of such a process being well suited for efficiently converting the upper-boiling point of a renewable feedstocks to a lower boiling product, such as non-fossil kerosene. In addition to said jet fuel, diesel and other hydrocarbons may also be produced.

In a further embodiment said hydrocarbon fraction suitable for use as jet fuel has a final boiling point according to ASTM D86 being less than 300° C., with the associated benefit of the product of such a process fulfilling boiling point specifications of the renewable jet fuel specification ASTM D7566.

In a further embodiment the total volume of hydrogen sulfide relative to the volume of molecular hydrogen in the gas phase of the combined feedstock directed to contact the material catalytically active in hydrodeoxygenation is at least 50 $ppm_v$, 100 $ppm_v$ or 200 $ppm_v$, optionally by adding a stream comprising one or more sulfur compounds, such as dimethyl disulfide or fossil fuels, with the associated benefit of such a process operating efficiently with a low cost material catalytically active in hydrodeoxygenation comprising sulfided base metal.

In a further embodiment the total volume of hydrogen sulfide relative to the volume of molecular hydrogen in the gas phase of the total stream directed to contact directed to contact the material catalytically active in hydrocracking is at least 50 $ppm_v$, 100 $ppm_v$ or 200 $ppm_v$, optionally by adding a stream comprising one or more sulfur compounds, such as dimethyl disulfide or fossil fuels, with the associated benefit of enabling the use of an inexpensive material catalytically active in hydrocracking comprising sulfided base metal(s).

In a further embodiment said feedstock comprises at least 50% wt triglycerides or fatty acids, with the associated benefit of such a feedstock being highly suited for providing a jet fuel with excellent properties.

In a further embodiment hydrodeoxygenation conditions involve a temperature in the interval 250-400° C., a pressure in the interval 30-150 Bar, and a liquid hourly space velocity (LHSV) in the interval 0.1-2 and wherein the material catalytically active in hydrodeoxygenation comprises one or more sulfided metals taken from the group of nickel, cobalt, molybdenum or tungsten, supported on a carrier comprising one or more refractory oxides, such as alumina, silica or titania, with the associated benefit of such process conditions being well suited for cost effective removal of heteroatoms, especially oxygen from a renewable feedstock.

In a further embodiment hydrocracking conditions involve a temperature in the interval 250-425° C., a pressure in the interval 30-150 Bar, and a liquid hourly space velocity (LHSV) in the interval 0.5-4, optionally together with intermediate cooling by quenching with cold hydrogen, feed or product and wherein the material catalytically active in hydrocracking comprises (a) one or more active metals taken from the group platinum, palladium, nickel, cobalt, tungsten and molybdenum, (b) an acidic support taken from the group of a molecular sieve showing high cracking activity, and having a topology such as MFI, BEA and FAU and amorphous acidic oxides such as silica-alumina and (c) a refractory support, such as alumina, silica or titania, or combinations thereof, with the associated benefit of such process conditions being highly suited for reducing the boiling point of a product to match the kerosene boiling point range.

In a further embodiment the amount of material boiling above 300° C. in said hydrocracked intermediate product is reduced by at least 20% wt, 50% wt or 80% wt or more compared to said of said bottom fraction, with the associated benefit of the high conversion being a minimization of product boiling above 300° C., as a result of a high process severity.

In a further embodiment at least an amount of said isomerized intermediate product is directed to contact a material catalytically active in hydrodearomatization under hydrodearomatization conditions to provide a hydrodearomatized product comprising less than 1 wt/wt %, 0.5 wt/wt % or 0.1 wt/wt %, calculated by total mass of the aromatic molecules relative to all hydrocarbons in the stream, with the associated benefit of the product of such a process fulfilling jet fuel specification ASTM D7566. Said material catalytically active in hydrodearomatization under hydrodearomatization conditions may be the material catalytically active in isomerization operating at moderate temperatures favoring hydrodearomatization. Hydrodearomatization conditions preferably involve at least 50% or 80% conversion of aromatics.

In a further embodiment hydrodearomatization conditions involve a temperature in the interval 200-350° C., a pressure in the interval 30-150 Bar, and a liquid hourly space velocity (LHSV) in the interval 0.5-8 and wherein said material catalytically active in hydrodearomatization comprises an active metal taken from the group comprising platinum, palladium, nickel, cobalt, tungsten and molybdenum, preferably one or more elemental noble metals such as platinum or palladium and a refractory support, preferably amorphous silica-alumina, alumina, silica or titania, or combinations thereof, with the associated benefit of such process conditions being suitable for hydrogenation of aromatics.

In a further embodiment a hydrogen rich stream comprising at least 90% vol hydrogen is directed to contact the material catalytically active in hydrodearomatization, with the associated benefit of directing high purity hydrogen required by the overall process to the hydrodearomatization step contributing to shifting the equilibrium away from aromatics.

In a further embodiment isomerization conditions involves a temperature in the interval 250-400° C., a pressure in the interval 30-150 Bar, and a liquid hourly space velocity (LHSV) in the interval 0.5-8 and wherein the material catalytically active in isomerization comprises an active metal taken from the group comprising platinum, palladium, nickel, cobalt, tungsten and molybdenum, preferably one or more elemental noble metals such as platinum or palladium, an acidic support preferably a molecular sieve, more preferably having a topology taken from the group comprising MOR, FER, MRE, MWW, AEL, TON and MTT and an amorphous refractory support comprising one or more oxides taken from the group comprising alumina, silica and titania, or combinations thereof, with the associated benefit of such conditions and materials being a cost effective and selective process for adjusting the cold flow properties of product.

A further aspect of the present disclosure relates to a process plant for production of a hydrocarbon fraction suitable for use as jet fuel from an oxygenate feedstock, said process plant comprising a hydrocracking section, a hydrodeoxygenation section, a separation section, an isomerization section, and a fractionation section, said process plant being configured for directing the feedstock, a hydrocracked intermediate product and optionally a liquid diluent to the hydrodeoxygenation section to provide a hydrodeoxygenated intermediate product, configured for separating said hydrodeoxygenated intermediate product in a vapor fraction and a liquid fraction in said separation section, configured for directing at least an amount of said liquid hydrodeoxygenated intermediate product to contact a material catalytically active in isomerization under isomerization conditions to provide an intermediate isomerized product, and configured for fractionating said isomerized intermediate product in said fractionation section to provide at least a hydrocarbon fraction suitable for use as jet fuel and a heavy product, directing at least an amount of said bottom product to contact a material catalytically active in hydrocracking under hydrocracking conditions providing said hydrocracked intermediate product, with the associated benefit of such a process plant being suited for carrying out the disclosed process for cost effective and selective production of jet fuel.

The processes described in the present disclosure receives a renewable feedstock and/or an oxygenate feedstock which comprises one or more oxygenates taken from the group consisting of triglycerides, fatty acids, resin acids, ketones, aldehydes, alcohols, phenols and aromatic carboxylic acids where said oxygenates originate from one or more of a biological source, a gasification process, a pyrolysis process, Fischer-Tropsch synthesis, methanol based synthesis or a further synthesis process, especially obtained from a raw material of renewable origin, such as originating from plants, algae, animals, fish, vegetable oil refining, domestic waste, used cooking oil, plastic waste, rubber waste or industrial organic waste like tall oil or black liquor. Some of these feedstocks may contain aromatics; especially products derived by pyrolysis or other processes from e.g. lignin and wood or waste products from e.g. frying oil. Depending on source, the oxygenate feedstock may comprise from 1 wt/wt % to 40 wt/wt %. Biological sources will typically comprise around 10 wt/wt %, and derivation products from 1 wt/wt % to 20 wt/wt % or even 40 wt/wt %.

For the conversion of renewable feedstocks and/or oxygenate feedstocks into hydrocarbon transportation fuels, the feedstocks are together with hydrogen directed to contact a material catalytically active in hydrotreatment, especially hydrodeoxygenation. Especially at elevated temperatures the catalytic hydrodeoxygenation process may have side reactions forming a heavy product e.g. from olefinic molecules in the feedstock. To moderate the release of heat, a liquid hydrocarbon may be added, e.g. a liquid recycle stream or an external diluent feed. If the process is designed for co-processing of fossil feedstock and renewable feedstock, it is convenient to use the fossil feedstock as diluent, since less heat is released during processing of fossil feedstock, as fewer heteroatoms are released and less olefins are saturated, but according to the present disclosure, the release of heat is moderated by recycling one or more liquid hydrocarbons. In addition to moderating the temperature, the recycle or diluent also has the effect of reducing the potential of olefinic material to polymerize The resulting product stream will be a hydrodeoxygenated intermediate product stream comprising hydrocarbons, typically n-paraffins, and sour gases such as $CO$, $CO_2$, $H_2O$, $H_2S$, $NH_3$ as well as light hydrocarbons, especially C3 and methane.

Typically, hydrodeoxygenation involves directing the feedstock to contact a catalytically active material typically comprising one or more sulfided metals taken from the group of nickel, cobalt, molybdenum or tungsten, supported on a carrier comprising one or more refractory oxides, typically alumina, but possibly silica or titania. The support is typically amorphous. The catalytically active material may comprise further components, such as boron or phosphorous. The conditions are typically a temperature in the interval 250-400° C., a pressure in the interval 30-150 Bar, and a liquid hourly space velocity (LHSV) in the interval 0.1-2. Hydrodeoxygenation is typically exothermal, and with the presence of a high amount of oxygen, the process may involve intermediate cooling e.g. by quenching with cold hydrogen, feed or product. The feedstock may preferably contain an amount of sulfur to ensure sulfidation of the metals, in order to maintain their activity. If the gas phase comprises less than 10, 50 or 100 $ppm_v$ sulfur, a sulfide donor, such as dimethyldisulfide (DMDS) may be added to the feed.

For the hydrodeoxygenated intermediate product stream to be used as a kerosene fraction, the boiling point range must be adjusted. A boiling point adjustment may also be required if an amount of heavy intermediate product was generated. The boiling point is adjusted by hydrocracking of long paraffins to shorter paraffins, by directing the hydrodeoxygenated intermediate product to contact a material catalytically active in hydrocracking. To ensure the highest overall selectivity, only the heavy fraction of the end product is recycled for hydrocracking.

Hydrocracking involves directing the hydrodeoxygenated intermediate feedstock to contact a material catalytically active in hydrocracking. The material catalytically active in hydrocracking typically comprises an active metal (which in the present disclosure is one or more sulfided base metals such as nickel, cobalt, tungsten and/or molybdenum), an acidic support (typically a molecular sieve showing high cracking activity, and having a topology such as MFI, BEA and FAU, but amorphous acidic oxides such as silica-alumina may also be used) and a refractory support (such as alumina, silica or titania, or combinations thereof). The catalytically active material may comprise further components, such as boron or phosphorous. Preferred hydrocracking catalysts comprise molecular sieves such as ZSM-5, zeolite Y or beta zeolite.

According to the present disclosure, the material catalytically active in hydrocracking may comprise base metal(s) or noble metal(s) and is positioned upstream the material catalytically active in hydrodeoxygenation, with the benefit of providing hydrocracked intermediate product as a diluent for the hydrotreatment only the material. Optionally an amount of the hydrodeoxygenation product may also be recycled, if a higher amount of diluent than the product of hydrocracking is required to control heat release in hydrodeoxygenation.

The conditions are typically a temperature in the interval 250-400° C., a pressure in the interval 30-150 Bar, and a liquid hourly space velocity (LHSV) in the interval 0.5-4. As hydrocracking is exothermal, the process may involve intermediate cooling e.g. by quenching with cold hydrogen, feed or product. The active metal(s) on the material catalytically active in hydrocracking is a base metal, so the intermediate hydrodeoxygenated feedstock including the gas phase is typically directed to contact the material catalytically active in hydrocracking without further purification. This gas phase of this mixture should preferably contain at least 50 $ppm_v$ sulfur.

For the hydrodeoxygenated intermediate product to be used as a fuel in practice, the freezing point must be adjusted. The freezing point is adjusted by isomerization of n-paraffins to i-paraffins, by directing the hydrodeoxygenated intermediate product to contact a material catalytically active in isomerization The material catalytically active in isomerization typically comprises an active metal (which according to the present disclosure is one or more elemental noble metals such as platinum and/or palladium), an acidic support (typically a molecular sieve showing high shape selectivity, and having a topology such as MOR, FER, MRE, MWW, AEL, TON and MTT) and a typically amorphous refractory support (such as alumina, silica or titania, or combinations thereof). The catalytically active material may comprise further components, such as boron or phosphorous. Preferred isomerization catalysts comprise molecular sieves such as EU-2, ZSM-48, beta zeolite and combined beta zeolite and zeolite Y.

Typically, isomerization involves directing the intermediate hydrodeoxygenated feedstock to contact a material catalytically active in isomerization. The conditions are typically a temperature in the interval 250-350° C., a pressure in the interval 30-150 Bar, and a liquid hourly space velocity (LHSV) in the interval 0.5-8. Isomerization is substantially thermally neutral so excessive hydrogen is typically not added in the isomerization reactor, but the presence of some hydrogen is required for isomerization to take place. As the active metal on the most selective materials catalytically active in isomerization is a noble metal, the hydrodeoxygenated feedstock is typically purified by gas/liquid separation to reduce the content of sulfur, nitrogen and carbon oxides to below 1-10 $ppm_{molar}$.

Hydrodeoxygenation of unsaturated fatty acids may produce aromatics as a side reaction. Therefore, even for an oxygenate feedstock comprising less than 1% aromatics, it may be further necessary to direct the isomerized product to contact a material catalytically active in hydrodearomatization.

In some instances, hydrodearomatization may be satisfactorily carried out in the presence of the material catalytically active in hydroisomerization, but it may also be necessary to have a separate reactor or reactor bed with material catalytically active in hydrodearomatization.

Such a material catalytically active in hydrodearomatization typically comprises an active metal (typically elemental noble metals such as platinum and/or palladium but possibly also sulfided base metals such as nickel, cobalt, tungsten and/or molybdenum) and a refractory support (such as amorphous silica-alumina, alumina, silica or titania, or combinations thereof). Hydrodearomatization is equilibrium controlled, with high temperatures favoring aromatics, noble metals are preferred as the active metal, since they are active at lower temperatures, compared to base metals.

Typically, hydrodearomatization involves directing an intermediate product to contact a material catalytically active in hydrodearomatization. As the equilibrium between aromatics and saturation molecules shifts towards aromatics at elevated temperatures, it is preferred that the temperature is moderate. The conditions are typically a temperature in the interval 200-350° C., a pressure in the interval 30-150 Bar, and a liquid hourly space velocity (LHSV) in the interval 0.5-8. The preferred active metal(s) on the material catalytically active in hydrodearomatization is often preferred to be noble metal(s), since noble metal catalysts in general are active at lower temperatures than comparable base metal catalysts. Base metal catalysts may also be used, and in this case the gas phase associated with intermediate hydrodeoxygenated feedstock preferably contains at least 50 $ppm_v$ sulfur. Often a hydrocracking or hydroisomerization catalyst operating at temperatures below 350° C. will be able to catalyze moderate hydrodearomatization, e.g. reducing 10% wt aromatics to below 0.5% wt aromatics.

This necessity to combine 3 or 4 catalytically active materials for conversion of renewable feedstocks into jet fuel naturally complicates the process layout, and the sequence of the materials must be considered carefully. In addition, recycle may be used for three different purposes; gas recycle for efficient use of hydrogen, liquid recycle around the material catalytically active in hydrocracking to maximize the yield of the kerosene fraction and liquid recycle around the material catalytically active in hydrodeoxygenation to limit the temperature increase due to exothermal hydrodeoxygenation reactions.

As isomerization and hydrodearomatization are carried out using a catalytically active material comprising noble metals, "sour gases", including hydrogen sulfide and ammonia, are removed prior to this reaction. An amount of the intermediate product of hydrodeoxygenation may also be recycled to the inlet of the hydrodeoxygenation reactor.

Operating according to the current disclosure, with recycle around the hydrodeoxygenation and hydrocracking reactors, has the benefit of allowing high hydrocracking conversion by multiple passes, rather than by severe conditions, thus allowing for full conversion at moderate temperatures, thus maintaining a high yield of kerosene and minimized over-cracking to naphtha and lighter. The use of an isomerization catalyst to improve freezing point of the jet fuel, allows increasing the distillation endpoint of the jet fuel while still meeting freezing point requirement. Finally, since the second stage will saturate aromatics, it is not required for the first stage to meet any aromatics requirements, which allows the first stage to treat heavier and/or more aromatic, naphthenic or unsaturated feedstocks as well as feedstocks such as used cooking oil, pyrolysis products or tall oil pitch, which contain aromatics or unsaturated feedstock which may produce aromatics in small amounts in typical hydroprocessing conditions, since these aromatics will be saturated in the second stage.

One embodiment according to the present disclosure corresponds to a process in which a stream comprising oxygenates and an intermediate hydrocracked stream, comprising an amount of sulfur is directed to a hydrodeoxygenation reactor containing a catalytically active material comprising one or more base metals and a refractory support, with low acidity. Such a material is active in hydrodeoxygenation and other hydrotreatment reactions removing heteroatoms and double bonds. The intermediate hydrocracked stream contribute as a heat sink, absorbing the released heat of reaction from the hydrodeoxygenation, thus maintaining a moderate temperature in the hydrodeoxygenation reactor. This step provides a stream comprising a high amount of saturated linear alkanes, in combination with an intermediate hydrocracked stream and an amount of water, CO, $CO_2$, methane, hydrogen sulfide and ammonia.

The hydrodeoxygenated hydrocarbon stream is directed to a separation section, withdrawing water, hydrogen sulfide and ammonia, and providing a sweet hydrocarbon stream. An amount of the sweet hydrocarbon stream is optionally recycled as sweet recycled hydrocarbons and an amount is directed as feed to an isomerization reactor containing a material catalytically active in isomerization and optionally a material catalytically active in hydrodearomatization. Both materials are based on a noble metal catalyst, such as platinum, palladium or a combination, in combination with an acidic support. For isomerization the acidic support is preferably shape selective, to provide a selective isomerization, rearranging linear alkanes to branched alkanes, with minimal production of lighter hydrocarbons. For hydrodearomatization, an acidic support also contributes to the reaction, and in addition, as the activity of noble metals is higher than that of base metals, the reaction will take place at lower temperatures. As the equilibrium between aromatic and non-aromatic compounds is shifted away from aromatics at low temperatures, noble metals provide the benefit that the lower temperature matches the equilibrium. Hydrodearomatization may even take place on the material catalytically active in isomerization, which often will have some hydrodearomatization activity.

As the sweet hydrocarbon stream does not contain hydrogen sulfide or ammonia, both the noble metal function and the acidic function of the material catalytically active in isomerization are undisturbed, and a branched hydrocarbon stream is produced with high selectivity.

The isomerized stream is directed to a fractionator (after appropriate removal of the gas phase in a separator train), and at least a gas fraction, an intermediate fraction and a bottoms fraction are withdrawn. A stream, preferably an amount of the bottoms product is recycled to the hydrocracking reactor.

The layout provides a conversion of feedstock to diesel, jet range or lighter product, as some or even all heavy hydrodeoxygenated hydrocarbons may be hydrocracked to yield lighter products. Jet/diesel co-production or only diesel production is possible, and the conversion of boiling point is mainly carried out in a hydrodeoxygenation section employing base metal catalysts only and an upstream hydrocracking section employing either base metal catalysts or noble metal catalyst, enabling addition of sulfur in the form of DMDS in a single process position; either upstream the hydrocracking section when both of these sections employ base metal catalysts, or downstream the hydrocracking section, when this section employs noble metal catalysts. Furthermore, the adjustment of freezing point is made selectively by isomerization on a noble metal catalyst, independently of hydrocracking conditions.

One benefit of an embodiment according to the present disclosure, where hydrocracking and hydrotreatment catalysts are both of base metal type, is that start-up of such a unit is simplified, as the combined hydrotreatment/hydrocracking section upstream the separation section may be activated by sulfidation, while the isomerization section downstream the separation section may be activated by reduction.

Should it be desired to produce only diesel and no jet fuel, hydrocracking is not desired. In this case, it may be preferred to either by-pass the hydrocracking reactor or alternatively cool the product prior to this reactor, such that it is inactive. The process plant may be configured for allowing such a configuration with short notice, e.g. by setting up appropriate equipment and control in the control room.

Figure 1:
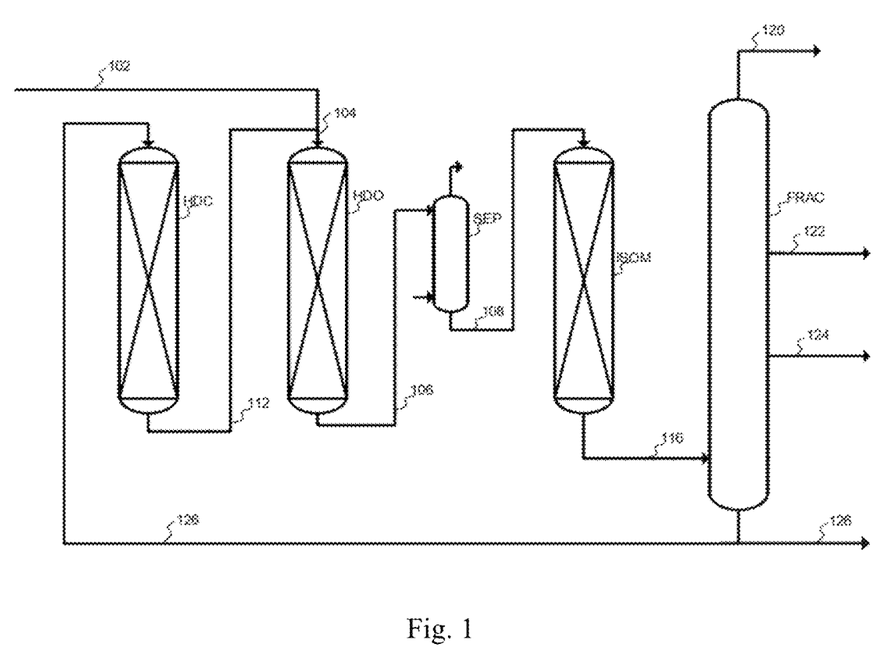
FIG. 1 shows a simplified illustration of a process according to the present disclosure.

FIG. 1 is a simplified figure showing a layout according to the present disclosure, omitting supply of gaseous streams and details of separation for simplicity. A recycle stream (126) together with an amount of a hydrogen rich stream (not shown) is directed to a hydrocracking reactor (HDC) operating under hydrocracking conditions, providing a hydrocracked intermediate product (112), which is combined with a renewable feedstock (102) and directed as a hydrodeoxygenation feed stream (104) optionally together with an amount of a hydrogen rich stream (not shown) to a hydrodeoxygenation reactor (HDO) where it contacts a material catalytically active in hydrogenation under hydrotreating conditions. This provides a hydrodeoxygenated intermediate product (106). The hydrodeoxygenated intermediate product (106) is directed to separator section (SEP), shown for simplicity as a single unit, separating the hydrodeoxygenated intermediate product in a gas stream for recycle and a liquid intermediate product stream (108). The liquid intermediate product stream (108) is optionally split in a recycle diluent stream to the hydrocracking or hydrodeoxygenation reactor (not shown) and an isomerization reactor feed stream (not shown) is together with a substantially sulfur free stream of hydrogen (not shown) directed as feed to an isomerization reactor (ISOM), where it contacts a material catalytically active in isomerization under isomerization conditions and optionally a further material catalytically active in hydrodearomatization under hydrodearomatization conditions, providing an isomerized product (116) which is directed to a fractionation section (FRAC) shown for simplicity as a single unit, separating the isomerized product in a light overhead stream (120), a naphtha product (122), a jet product (124) and a bottom diesel fraction (126). An amount of the bottom diesel fraction (126) is as mentioned directed as recycle stream.

The isomerized product (116) may optionally contact a further material catalytically active in hydrodearomatization (not shown) under hydrodearomatization conditions, providing an isomerized product.

Figure 2:
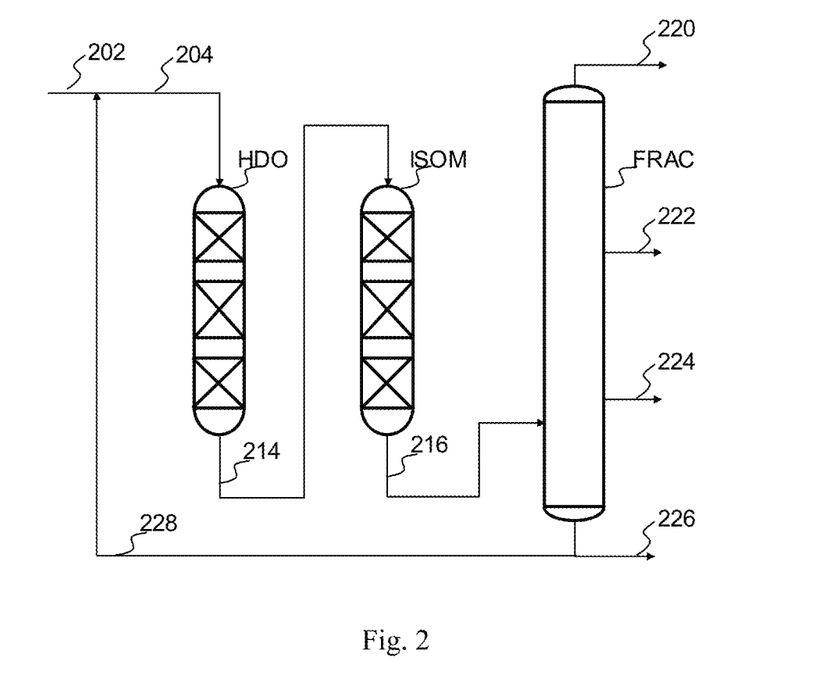
FIG. 2 shows a simplified illustration of a process according to the prior art.

FIG. 2 shows an example of the prior art, in a level of detail similar to FIG. 1, omitting supply of gaseous streams and details of separation for simplicity. A renewable feedstock (202) is combined with a recycle diluent stream (228) and directed as a hydrodeoxygenation feed stream (204) together with an amount of a hydrogen rich stream (not shown) to a hydrodeoxygenation reactor (HDO) where it contacts a material catalytically active in hydrogenation under hydrotreating conditions. This provides a hydrodeoxygenated intermediate product (214), which is directed to a hydroisomerization reactor (ISOM) where it contacts a material catalytically active in isomerization under isomerization conditions, providing a dewaxed intermediate product (216). The dewaxed intermediate product (216) is directed to a fractionation section (FRAC) shown for simplicity as a single unit, separating the hydrocracked product in a light overhead stream (220), a naphtha stream (222), a jet product (224) and a bottom diesel fraction which is split in a recycle diluent stream (228) and a diesel product stream (226).

Figure 3:
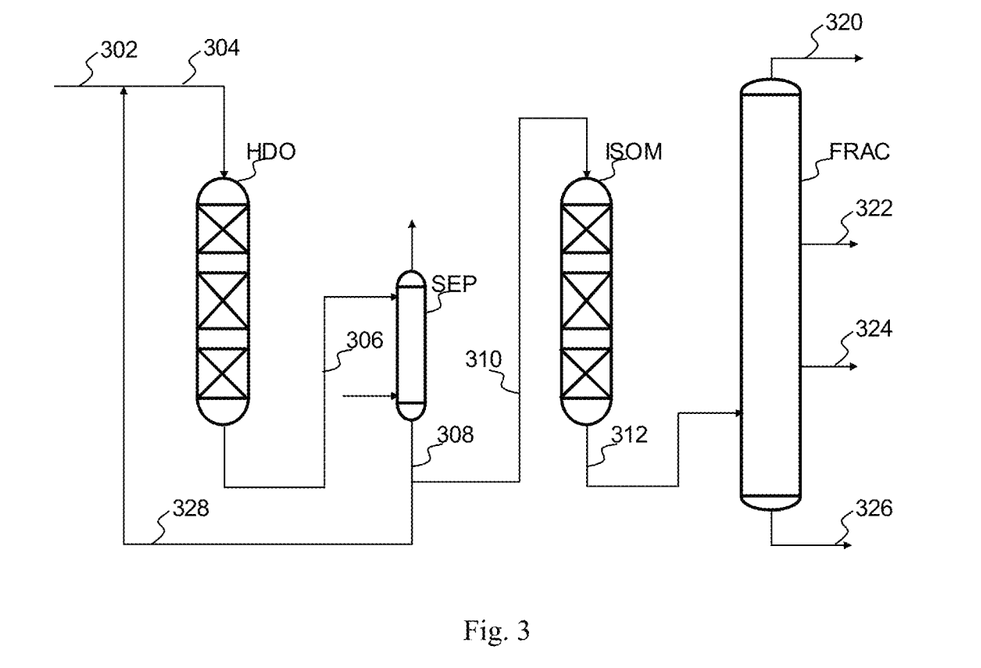
FIG. 3 shows a simplified illustration of a process according to the prior art.

FIG. 3 shows a further example of the prior art, omitting supply of gaseous streams and details of separation for simplicity. A renewable feedstock (302) is combined with a recycle diluent stream (328) and directed as a hydrodeoxygenation feed stream (304) together with an amount of a hydrogen rich stream (not shown) to a hydrodeoxygenation reactor (HDO) where it contacts a material catalytically active in hydrogenation under hydrotreating conditions. This provides a hydrodeoxygenated intermediate product (306), which is directed to a separator (SEP), from which a purified hydrodeoxygenated intermediate product (308) is retrieved, and split in a recycle diluent stream (328) and an isomerization feed stream (310), which is combined with a sulfur free hydrogen stream (not shown) and to a hydroisomerization reactor (ISOM). In this reactor the combined feed stream contacts a noble metal based material catalytically active in isomerization under isomerization conditions, providing a dewaxed intermediate product (312). The dewaxed intermediate product (312) is directed to a fractionation section (FRAC) shown for simplicity as a single unit, separating the hydrocracked product in a light overhead stream (320), a naphtha stream (322), a jet product (324) and a bottom diesel fraction (326).

EXAMPLES

The performance of the process layouts shown in FIGS. 1 and 3 have been compared.

Table 1 shows the characteristics of a renewable feedstock which is a combination of animal fat and cooking oil and the intermediate products after hydrotreatment. The intermediate product is dominated by C16 and C18 alkanes, has a high freezing point (24° C.) and contains more than 1.5 wt/wt % aromatics. The feedstock was treated in two processes in accordance with FIGS. 1 and 3 respectively, and the results of this treatment are shown in Table 2 where "Example 1" corresponds to FIG. 1 and "Example 2" corresponds to FIG. 2. The values for "net jet make" are calculated as the amount of jet produced in the process, subtracting the amount of jet already present in the feedstock by the formula net jet make=[total jet product]−[native jet present in the feed]. Yields are presented in this table as wt/wt % of feed to the unit. Eg. a Jet yield of 51 wt/wt % indicate that 51 kg of jet fuel is produced for each 100 kg of feed that is processed in the unit.

The results of both examples show a production of a jet fuel with excellent properties, a low freezing point (−40° C.) and a low aromatics content (<0.5% wt). Example 1 according to the present disclosure has a jet yield of 54 wt/wt %, whereas Example 2 has a jet yield of 43 wt/wt %, assuming a cut point between jet and diesel of 300° C. In the optimization of a process under the assumption of a higher value of jet fuel, this difference is evidently a highly attractive benefit of Example 1. The improved yield is due the conversion of high boiling diesel to jet fuel in the hydrocracking reactor.

TABLE 1

Feedstock

| Source | Feedstock Animal fat/used cooking oil |
|---|---|
| C16 fatty acids | 20 wt/wt % |
| C18 fatty acids | 74 wt/wt % |

Properties of hydrodeoxygenated intermediate product

| Property | Method of Analysis | |
|---|---|---|
| Freezing point | ASTM D 5972 | 24° C. |
| Aromatics | ASTM D 6591 | 1.5 wt/wt % |
| Boiling point (° C.) | ASTM D 7213 C | |
| IBP | | 200 |
| 10 wt/wt % | | 290 |
| 30 wt/wt % | | 317 |
| 50 wt/wt % | | 321 |
| 70 wt/wt % | | 323 |
| 90 wt/wt % | | 324 |
| FBP | | 482 |
| Native jet, 110-300° C. | % wt | 17 |

| | Example 1 | Example 2 |
|---|---|---|
| P | 70 barg | 70 barg |
| T(HDO) | 320° C. | 320° C. |
| T(HDC) | 340° C. | — |
| LHSV (HDC) | 0.6 | — |
| T(ISOM) | 325° C. | 330° C. |
| LHSV (ISOM) | 2 | 2 |
| Net jet make | 37 | 26 |
| Freezing pt Jet | −40° C. | −40° C. |
| Aromatics Jet | <0.5 wt/wt % | <0.5 wt/wt % |
| Naphtha Yield (bp. 60° C.-110° C.) | 7 wt/wt % | 5 wt/wt % |
| Jet yield (bp. 110° C.-300° C.) | 54 wt/wt % | 43 wt/wt % |
| Diesel yield (bp. 300° C.-370° C.) | 21 wt/wt % | 35 wt/wt % |

The invention claimed is:

1. A process for production of a hydrocarbon fraction suitable for use as jet fuel from an oxygenate feedstock, comprising the steps of
   a. combining the feedstock with an amount of a hydrocracked intermediate product and optionally a liquid diluent to form a combined feedstock, directing said combined feedstock to contact a material catalytically active in hydrodeoxygenation under hydrotreating conditions to provide a hydrodeoxygenated intermediate product,
   b. separating said hydrodeoxygenated intermediate product in at least two fractions including a vapor fraction and a liquid fraction,
   c. optionally providing an amount of said liquid fraction as said liquid diluent, directing at least an amount of said liquid fraction to contact a material catalytically active in isomerization under isomerization conditions to provide an isomerized intermediate product,
   d. fractionating said isomerized intermediate product to provide at least a hydrocarbon suitable for use as jet fuel and a bottom fraction,
   directing at least an amount of said bottom fraction to contact a material catalytically active in hydrocracking under hydrocracking conditions to provide the hydrocracked intermediate product.

2. The process according to claim 1, wherein said hydrocarbon fraction suitable for use as jet fuel has a final boiling point according to ASTM D86 being less than 300° C.

3. The process according to claim 1, wherein the volume of hydrogen sulfide relative to the volume of molecular hydrogen in the gas phase of the combined feedstock directed to contact the material catalytically active in hydrodeoxygenation is at least 50 ppm$_v$, optionally by adding a stream comprising one or more sulfur compounds.

4. The process according to claim 1, wherein the volume of hydrogen sulfide relative to the volume of molecular hydrogen in the gas phase of the total stream directed to contact the material catalytically active in hydrocracking is at least 50 ppm$_v$, optionally by adding a stream comprising one or more sulfur compounds.

5. The process according to claim 1, wherein said feedstock comprises at least 50% wt triglycerides or fatty acids.

6. The process according to claim 1, wherein hydrodeoxygenation conditions involve a temperature in the interval 250-400° C., a pressure in the interval 30-150 Bar, and a liquid hourly space velocity in the interval 0.1-2 and wherein the material catalytically active in hydrodeoxygenation comprises one or more sulfided metals taken from the group of nickel, cobalt, molybdenum or tungsten, supported on a carrier comprising one or more refractory oxides.

7. The process according to claim 1, wherein hydrocracking conditions involve a temperature in the interval 250-425° C., a pressure in the interval 30-150 Bar, and a liquid hourly space velocity in the interval 0.5-4, optionally together with intermediate cooling by quenching with cold hydrogen, feed or product and wherein the material catalytically active in hydrocracking comprises (a) one or more active metals taken from the group platinum, palladium, nickel, cobalt, tungsten and molybdenum, (b) an acidic support taken from the group of a molecular sieve showing high cracking activity, and amorphous acidic oxides and (c) a refractory support.

8. The process according to claim 1, wherein the amount of material boiling above 300° C. in said hydrocracked intermediate product is reduced by at least 20% wt compared to said bottom fraction.

9. The process according to claim 1, wherein at least an amount of said isomerized intermediate product is directed to contact a material catalytically active in hydrodearomatization under hydrodearomatization conditions to provide a hydrodearomatized product comprising less than 1 wt/wt %, calculated by total mass of the aromatic molecules relative to all hydrocarbons in the stream.

10. The process according to claim 9, wherein hydrodearomatization conditions involve a temperature in the interval 200-350° C., a pressure in the interval 30-150 Bar, and a liquid hourly space velocity in the interval 0.5-8 and wherein said material catalytically active in hydrodearomatization comprises an active metal taken from the group comprising platinum, palladium, nickel, cobalt, tungsten and molybdenum, and a refractory support.

11. The process according to claim 8, wherein a hydrogen rich stream comprising at least 90% vol hydrogen is directed to contact the material catalytically active in hydrodearomatization.

12. The process according to claim 1, wherein isomerization conditions involves a temperature in the interval 250-350° C., a pressure in the interval 30-150 Bar, and a liquid hourly space velocity in the interval 0.5-8 and wherein the material catalytically active in isomerization comprises an active metal taken from the group comprising platinum, palladium, nickel, cobalt, tungsten and molybdenum, an acidic support, and an amorphous refractory support comprising one or more oxides taken from the group comprising alumina, silica and titania or combinations thereof.

13. The process according to claim 1, wherein
the material catalytically active in hydrodeoxygenation comprises one or more sulfided metals taken from the group of nickel, cobalt, molybdenum or tungsten, supported on a carrier comprising an amorphous refractory oxides,
the material catalytically active in isomerization comprises one or more elemental noble metals, a molecular sieve and an amorphous refractory support,
the material catalytically active in hydrocracking comprises one or more sulfided base metals such as nickel, cobalt, tungsten and/or molybdenum, an acidic support and a refractory support.

\* \* \* \* \*